United States Patent
Chainer et al.

(10) Patent No.: US 6,603,627 B1
(45) Date of Patent: Aug. 5, 2003

(54) CREATING AN INITIAL SET OF TRACKS IN A SELF-SERVOWRITING SYSTEM USING A COMPLIANT CRASHSTOP TO CONTROL HEAD MOVEMENT

(75) Inventors: Timothy Joseph Chainer, Mahopac, NY (US); Mark Delorman Schultz, Elmsford, NY (US); Edward John Yarmchuk, Somers, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 473 days.

(21) Appl. No.: 09/584,302

(22) Filed: May 31, 2000

(51) Int. Cl.[7] .............................................. G11B 21/02
(52) U.S. Cl. ......................................................... 360/75
(58) Field of Search ............................................ 360/75

(56) References Cited

U.S. PATENT DOCUMENTS

| | | | |
|---|---|---|---|
| 5,659,436 A | | 8/1997 | Yarmchuk et al. ............ 360/75 |
| 5,757,574 A | | 5/1998 | Chainer et al. ............... 360/75 |
| 5,771,130 A | * | 6/1998 | Baker ........................... 360/75 |
| 6,191,911 B1 | * | 2/2001 | Cai et al. ................. 360/77.03 |
| 6,344,942 B1 | * | 2/2002 | Yarmchuk .................... 360/75 |
| 6,392,831 B1 | * | 5/2002 | Yeo et al. ..................... 360/53 |
| 6,480,361 B1 | * | 11/2002 | Patterson .................. 360/254.3 |

* cited by examiner

*Primary Examiner*—David Hudspeth
*Assistant Examiner*—Mitchell Slavitt
(74) *Attorney, Agent, or Firm*—Blanche E. Schiller

(57) ABSTRACT

A technique for self-servowriting a servopattern on a data storage medium is disclosed. An initial set of servopattern tracks is written by moving an actuator against a compliant structure (e.g., crashstop) with a first force applied thereto to hold the actuator in a first position to write a first track of the servopattern. The force is changed, thereby reaching a second position of the actuator against the compliant structure, at which a second track of the servopattern is written. The process is iterated for additional tracks. The distances (i.e., overlap) between pairs of written tracks are measured using a read element of the actuator, and this measured distance is compared to predetermined, desired distance. If the measured distance is within a specified tolerance, the process is complete; and if not, the tracks are erased and the process is repeated with changed forces applied to the actuator against the crashstop resulting in modified distances between tracks. The present invention overcomes the problem of self-servowriting an initial set of tracks of a servopattern, especially when the read element is separated from the write element in a direction along which the servowriting steps.

26 Claims, 5 Drawing Sheets

CREATING AN INITIAL SET OF TRACKS IN A SELF-SERVOWRITING SYSTEM USING A COMPLIANT CRASHSTOP TO CONTROL HEAD MOVEMENT

TECHNICAL FIELD

The present invention relates to data storage media. More particularly, the present invention relates to the self-servowriting of servo patterns on storage media.

BACKGROUND OF THE INVENTION

Self-servowriting has become an attractive technique for producing servopatterns on disk files because it eliminates the need for costly, external positioning systems, and can be performed outside of a clean room environment. In general, this technique involves using the read and write elements installed on the actuator of the disk drive "in-situ" to initially write the servopattern, which is thereafter used to correctly position the actuator during drive operation by a user.

Techniques for self-propagation of both radial positioning servopatterns and circumferential timing patterns have been developed recently. For example, in commonly assigned U.S. Pat. No. 5,659,436 entitled "Radial Self-Propagation Pattern Generation for Disk File Servowriting" (incorporated by reference herein in its entirety) the servo position signal used to control the head location while writing the next servo track is derived from the readback amplitude of a single track written one step earlier. The process begins with the actuator held against a limit stop called the crashstop. A track is written, and the read element steps forward a small distance to servo at a point on the leading edge of the written track at which the amplitude has dropped by some predetermined fractional amount.

In modern disk files, however, the read element can be offset from the write element on the actuator by as much as several tracks. When this read-to-write element offset gets large, it becomes desirable to use a combination of readback amplitudes from several earlier-written tracks to provide the position signal for the next track as described in commonly assigned U.S. Pat. No. 5,757,574 (incorporated by reference herein in its entirety) entitled "Methods and Systems for Self-Servowriting Including Maintaining a Reference Level Within a Usable Dynamic Range" and in the commonly assigned, concurrently filed Application entitled "Techniques For Multitrack Positioning and Controlling Error Growth in Self-Servowriting Systems" (also incorporated by reference herein in its entirety). In such cases, especially when the read-to-write offset is especially large (so that the write element cannot "reach" the first few tracks to write an initial propagation pattern when the head is against the crashstop), a need exists for providing an initial set of written tracks that can be used for subsequent multitrack servo and self-propagation.

SUMMARY OF INVENTION

The initial set of tracks is written in accordance with a first aspect of the present invention in which the actuator is moved against a compliant structure (e.g., crashstop) with a first force applied thereto to hold the actuator in a first position to write a first track of the servopattern. The force is changed, thereby reaching a second position of the actuator against the compliant structure, at which a second track of the servopattern is written.

The process is iterated for additional tracks. The distances (i.e., overlap) between pairs of written tracks are measured using a read element of the actuator, and this measured distance is compared to predetermined, desired distance. If the measured distance is within a specified tolerance, the process is complete; and if not, the tracks are erased and the process is repeated with changed forces applied to the actuator against the crashstop resulting in modified distances between tracks.

The present invention overcomes the problem of self-servowriting an initial set of tracks, especially when the read element is separated from the write element (i.e., the write element cannot reach the first few tracks) by using the compliant property of a nearby structure (e.g., a crashstop) which provides temporary positioning over the first few tracks, and which allows the write element to reach those tracks.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE INVENTION

Figure 1:
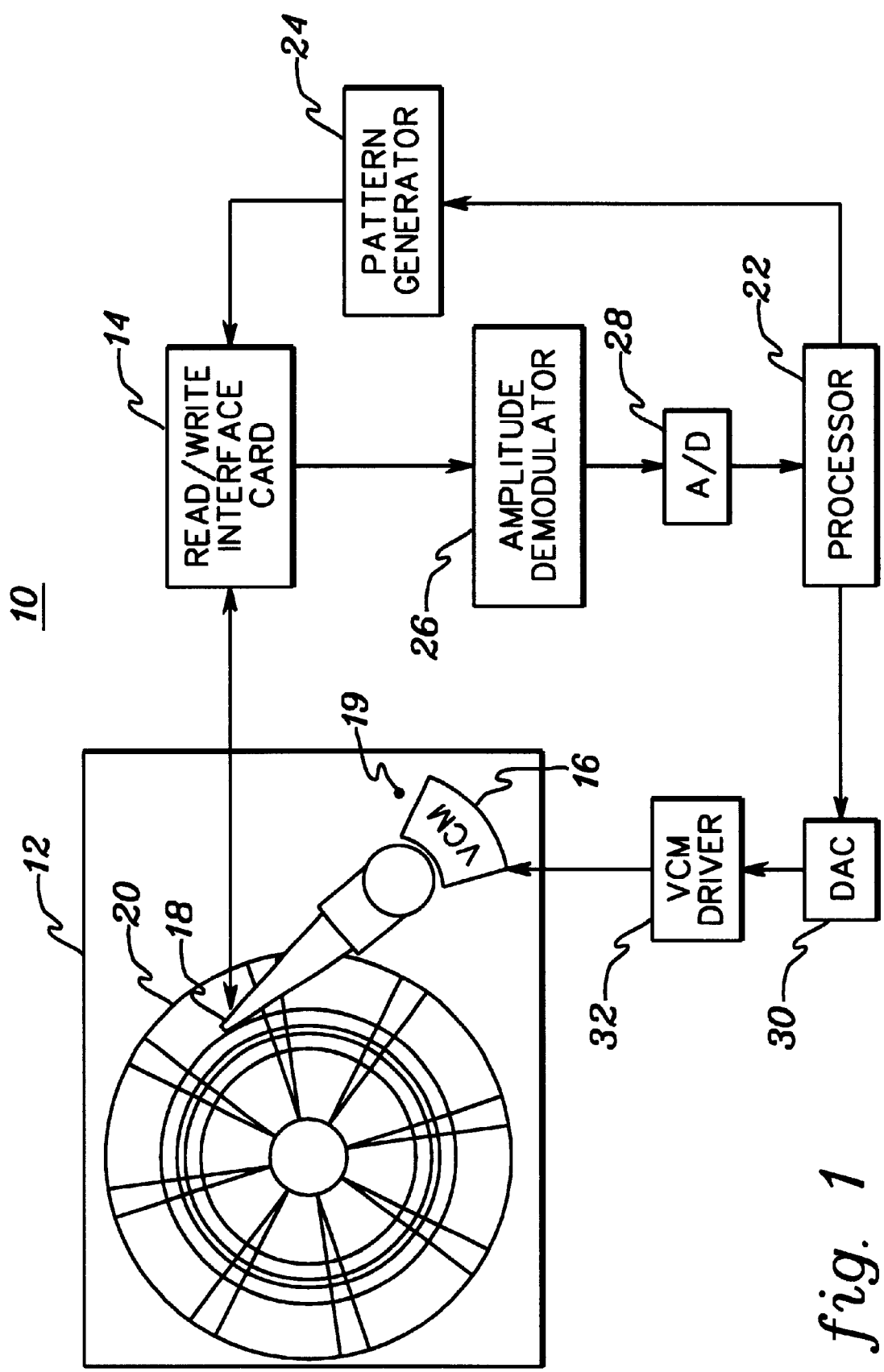
FIG. 1 depicts a data storage device with a storage medium, associated servo electronics and crashstop used in the self-servowriting of the present invention.

FIG. 1 shows the exemplary elements of a data storage system 10, which are used for radial self-propagation and servopattern writing. A disk file 12 is connected to electronics 14 for reading and writing patterns on the medium 20, and for activating the voice coil motor ("VCM") 16 that moves the arm, which terminates with head 18, approximately radially across the medium 20. The term "actuator" is used broadly herein to connote any/all of the moveable components 16 (VCM), the arm, and the head 18 (with its associated access elements).

A crashstop 19 is shown that provides a limit to the actuator movement at the inner diameter ("ID") of the disk. Typically this is a cylindrical shaped rod that the side of the actuator pushes against. In some cases another stop is present for the outer diameter ("OD") but there may also be a load/unload ramp located at the OD that allows the head to be lifted and moved beyond the edge of the disk.

The processor 22 controls a pattern generator 24 that writes patterns of magnetic transitions on selected regions of the medium. The RF readback signal from the read element is demodulated 26 to yield amplitude signals that reflect the overlap of the read element with the previously written patterns of magnetic transitions. The amplitude signals are digitized by an analog-to-digital converter 28 ("A/D") and analyzed by the processor 22 to obtain a position signal. The processor 22 computes numerical control signals that are converted to analog form by the digital-to-analog converter ("DAC") 30 and processed into a control current by the VCM driver circuit 32, to drive the VCM 16 and position the head 18 appropriately over the medium.

Figure 2:
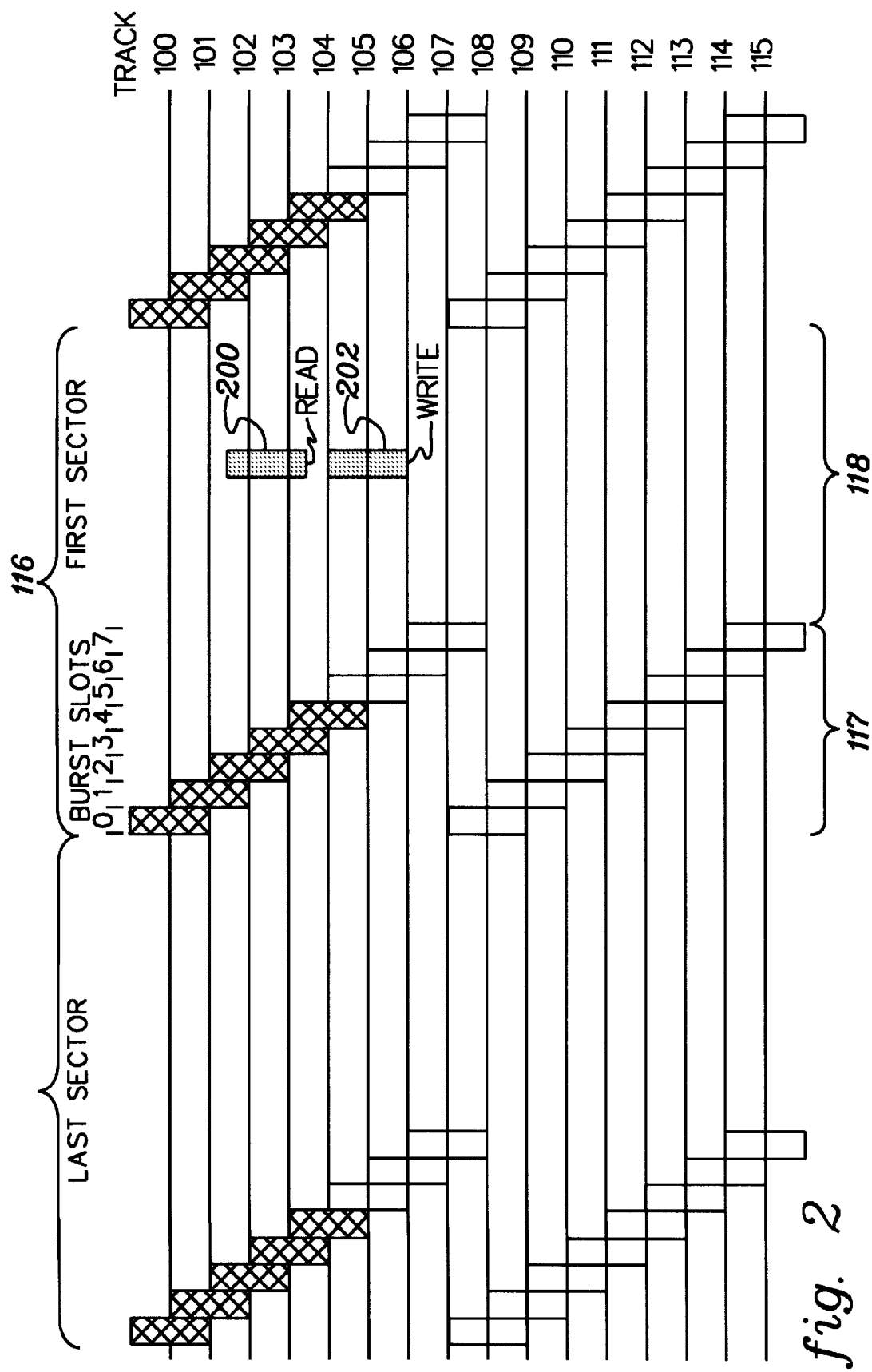
FIG. 2 depicts a portion of the storage medium of FIG. 1 showing exemplary tracks, and self-servowriting bursts written therein.

FIG. 2 shows a portion of the recording medium illustrating its division into a number of propagation tracks 100, 101, 102, etc. as well as a division of each track into a number of sectors, with a first sector 116 typically coming immediately after the disk rotation index as determined by an index pulse from the disk spindle motor driver. Each sector is further divided into a region 117 containing the amplitude bursts for propagation and a region 118, which is reserved for the use of the precision timing propagation system and for writing the actual product servopattern including sector ID fields and either amplitude burst or phase encoded patterns. In one embodiment of this system, propagation burst areas 117 will be overwritten with user data during user operation, following self-servowriting. All of region 118 except for the portion containing the product servopattern may also be overwritten with user data.

Each propagation burst region is further divided into a number of burst slots within which the amplitude burst patterns for propagation are written. In this example, 8 slots numbered 0–7 are shown. Also shown are the read element 200 and write element 202 in an exemplary position over the medium. The write element is positioned for writing track 105, and due to the large offset, the read element straddles several previously written tracks. At a servo track spacing of one half of the data cylinder spacing, the read element can typically overlap 3 tracks at any time, as shown in FIG. 2.

In this figure, crosshatched bursts indicate bursts on tracks that have already been written. With large read-to-write offsets, several initial tracks must be prepared in advance before a servo based on multiple tracks can be employed. Methods for generating initial tracks include:

Writing initial tracks on one or more disk surfaces using a positioning system either before or after the disks are assembled into the file. Drawbacks of this technique are that it involves extra handling and expensive servowriting equipment, and must be performed in a clean room environment. Additional difficulties arise if the disks are written before assembly because the tracks will be imperfectly centered on the spindle and may therefore have large runout.

Writing initial tracks on one or more disk surfaces using a position sensor or portions thereof that are sealed within the disk file itself, and which allow servo control of the head position while writing. Drawbacks of this technique are the additional cost and component integration issues associated with adding components to the disk files.

The present invention provides a technique for creating an initial set of equally spaced tracks that are suitable for multitrack servo, and which can be used with, or more advantageously without, the use of external positioning devices, or additional internal sensors.

The present invention recognizes that crashstops are not completely rigid, but have some compliance. Typically, a crashstop is a metal post coated with an elastomer such as Flourel. The compressible coating allows the head to be moved a small distance by pushing the actuator against the crashstop using the VCM itself. Thus, the crashstop can provide controllable movement of the head simply by varying the VCM current. Closed-loop servo control of position is not required as long as contact with the crashstop is maintained.

Therefore, the head can be moved and tracks written without requiring the read element to overlap the written information, since head movement is controlled by the compliant crashstop.

Figure 3:
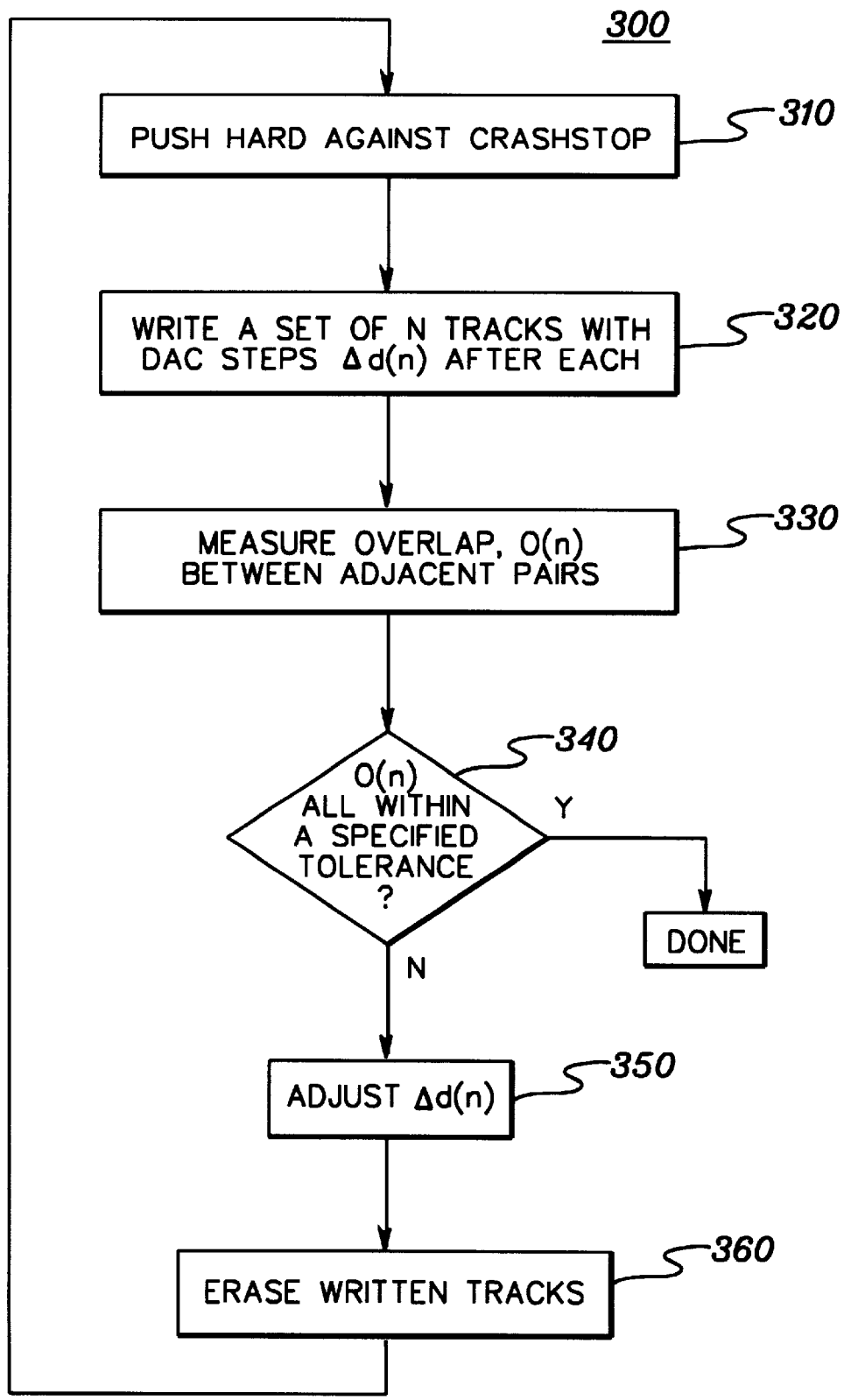
FIG. 3 is a high-level flow diagram of the present invention wherein the crashstop is used to provide predictable head positioning while interactively writing and measuring initial sets of tracks.

FIG. 3 is a flow diagram 300 of the basic steps of the present invention. The first step 310 is to force the arm hard against the crashstop using a large VCM dac value. Then, a series of tracks are written (Step 320) with the VCM dac stepped by a certain amount between tracks. Since the mechanical characteristics of crashstops are not always sufficiently reproducible to allow the dac steps to be completely predetermined by experiments on prototypes, this first pass of writing uses initial guesses for the dac step sizes. These may be predetermined by experiments on a small number of prototypes. (Writing the first set of tracks is described in greater detail below with respect to FIG. 4.)

Next, the spacing between tracks is checked by measuring the "overlap" signal (Step 330) which is equal to the sum of the normalized readback amplitudes for a pair of tracks when the read element is positioned such that it overlaps both tracks by approximately equal amounts. This overlap signal decreases with increasing track spacing and therefore provides a measurement of relative track spacing (described in more detail below with respect to FIG. 5).

The overlap for each pair of tracks is compared to a desired overlap target value $O_{target}$ (Step 340). If all pairs match within a specified tolerance, the process is complete. If not, adjustments are made to the dac steps (Step 350) to improve the agreement on the next attempt, following track erasure (Step 360). In this way, the differences between crashstop compliance from file to file can be automatically accommodated. The overlap target is predetermined, and corresponds to a value that yields the desired spacing between servo tracks.

Before repeating the writing step with the improved dac step values, the old pattern is erased (Step 360). The VCM dac is set to a value that typically brings the arm into light contact with the crashstop and the write gate is enabled to provide continuous DC erasure. The dac is gradually stepped to higher values in a manner that ensures that the head moves less than one write width during each revolution of the disk.

At this point the arm is once again pushed hard against the crashstop (Step 310), and the process of writing another sequence of tracks is ready to begin. The sequence of erase/write/check/adjust is repeated until the spacing is within specified tolerance limits. The final set of tracks are not erased because they will be used to begin the actual self-servowriting propagation across the disk.

Figure 4:
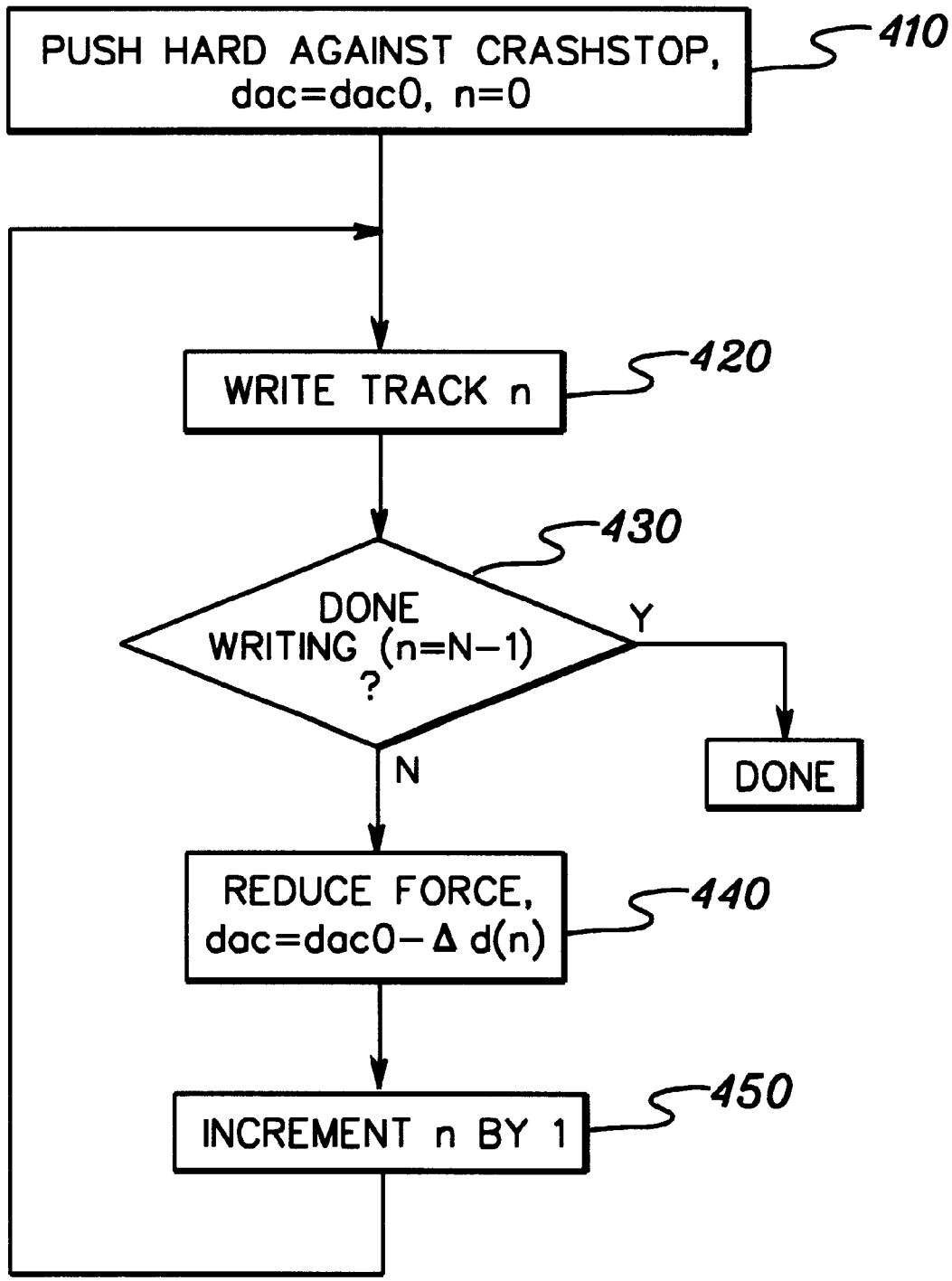
FIG. 4 is a detailed flow diagram of the portion of FIG. 3 involving writing tracks.

FIG. 4 is a flow diagram 400 illustrating the detailed steps involved with writing a sequence of N initial tracks numbered n=0,1,2, . . . N−1. The dac value dac0 for pushing hard against the crashstop (Step 410) is chosen to give a total compression that is large enough to span the required number of tracks, N, and can be determined by experiment using prototypes of the disk file.

In writing track n (Step 420), the processor commands the pattern generator to write magnetic transitions in burst slot n of every sector.

The number of tracks, N, that are required (which determine the "finish" Inquiry 430) depends on the offset distance between the read and write elements. For the situation shown in FIG. 2, the read to write offset is about 2.7 steps. In this case, the read element overlaps tracks 101–103 so three tracks would be used for the multitrack servo. With the write element positioned for writing track 105, this situation requires at least 4 initial tracks.

For the next track n, the force is reduced by an increment Δd(n) (Step 440), and the process is repeated for the next track by incrementing n (Step 450) and writing track n (Step 420).

In principle, initial guesses for the dac step increments Δd(n) used in Step 440 can be calculated based on the torque constant of the VCM and the elastic properties of the crashstop. However, they are more easily determined empirically by trying various guesses on prototypes of the disk file. One method is to choose equal step values for all n of moderate size and let the iterations in the overall process converge to a final set, Δd(n). This particular final set, or an average of sets for several files, could be used for the initial guesses in a production process. One choice for a moderate starting value is to divide the initial compression by N, where the compression is given by dac0 less the dac value required to lightly contact the crashstop. Note that the dac steps determine the spacing between tracks, so for N tracks, only N−1 steps are actually needed, and the n values for Δd(n) range from 0 to N−2.

Figure 5:
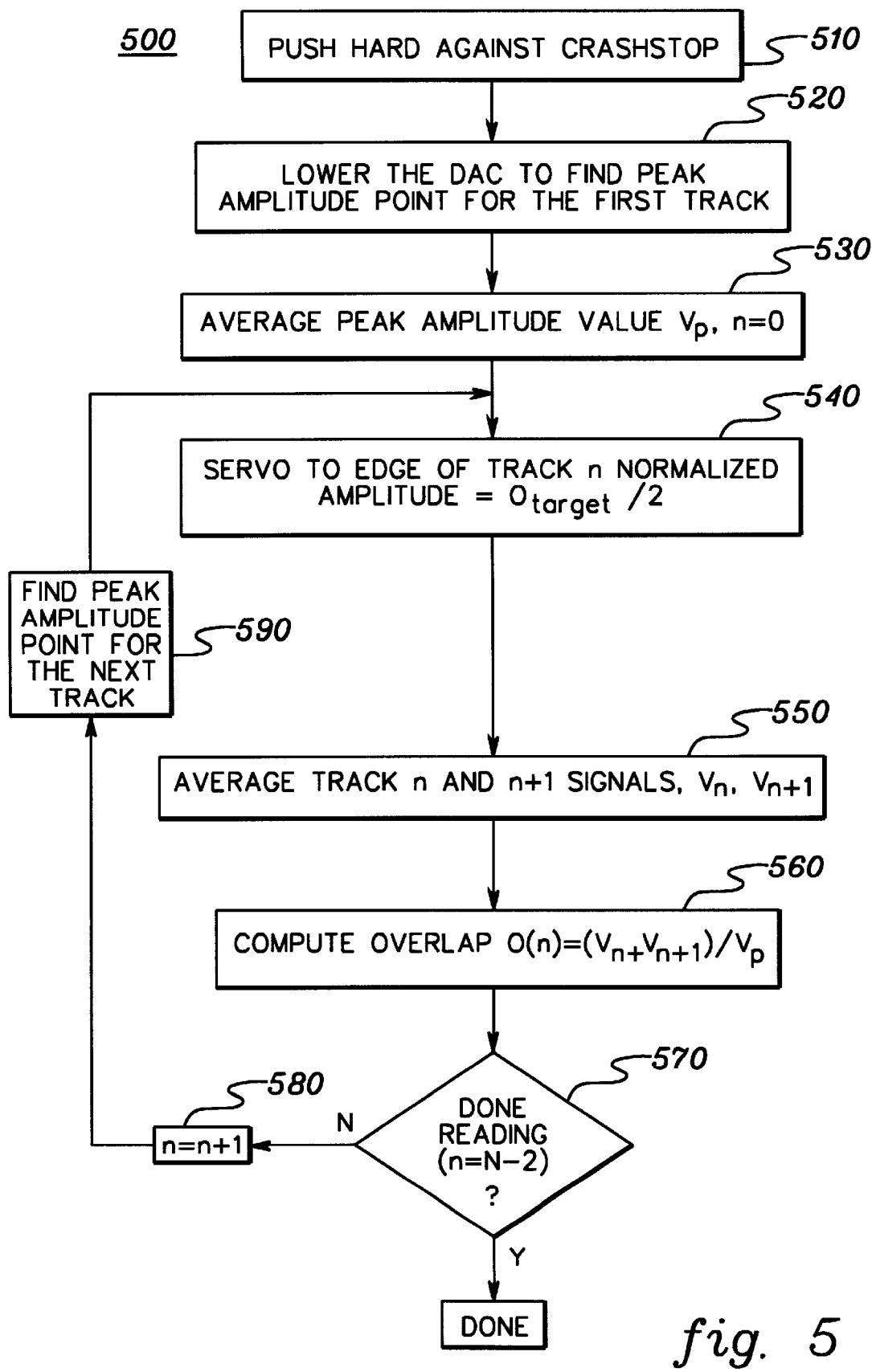
FIG. 5 is a detailed flow diagram of the portion of FIG. 3 involving measuring the distance between written tracks.

Measuring the overlap between pairs of tracks involves a number of steps which are shown in the flow diagram 500 of FIG. 5. Starting with the actuator pushed hard against the crashstop (Step 510), the dac is lowered by small steps while measuring the readback amplitude for the first track (Step 520) to locate the peak amplitude. For the situation shown in FIG. 2, this would be the amplitude measured for burst slot 0. Once the peak has been found, by moving the head by small steps to find the maximum readback signal, the amplitude is averaged over the length of the track to get a normalization term $V_p$ (Step 530).

Typically, a spacing measurement based on overlap would move the read element to the point where the readback signals from the two tracks are equal. In this case, however, the initial track spacing may be far from the target value, leading to situations in which the overlap is too low or too high for stable servo using the difference signal. Therefore, the servo controller is used to bring the read element to the location where the normalized signal, $V/V_p$ equals ½ of the target overlap signal $O_{target}$ (Step 540), i.e., at (but not necessarily centered on) the edge of the track. Servoing to a single edge guarantees that the servo will be stable. $O_{target}$ is the desired overlap return signal, which is a parameter easily calculated based on the desired spacing between tracks. The signals for burst slots 0 and 1, $V_0$ and $V_1$, are averaged over one or more revolutions of the disk (Step 550), divided by the normalization term, $V_p$, and summed to obtain the overlap, O(0) (Step 560). After several iterations the overlap will be close to the target, so the signals from the two tracks will become nearly equal anyway.

Overlap for the next track of interest is obtained by finding the peak amplitude point of the next track (Steps 570, 580 and 590), and repeating the steps 540, 550 and 560. The process continues until all pairs of tracks have been measured.

For the exemplary medium surface of FIG. 2, wherein the track spacing is one half of the written track width, the above overlap measurements can be taken for, e.g., non-consecutive pairs of tracks (100 and 102; 101; 103; etc.). In this case, the target overlap is 1.0 (i.e., the edges of the tracks touching, but not overlapping.) One skilled in the art will recognize that the target overlap can be sought for any pairs of tracks, not necessarily consecutively written tracks, and all step values and target values throughout the process can be adjusted accordingly.

Returning to FIG. 3, the adjustment of the dac step values Δd(n) is done on an individual basis for each n, based on the value of the corresponding overlap result O(n). In one embodiment, Δd(n) is changed by an amount proportional to $O(n)-O_{target}$. The constant of proportionality would be determined empirically by experimenting with prototypes, starting with a small value and increasing it until a desired rate of convergence is obtained.

At the end of the process, a set of N tracks will have been written at nearly equal spacing (depending on the specified overlap tolerance).

In another embodiment, measurements of readback amplitudes are added to the writing process to determine the proper servo reference value to use for writing subsequent tracks during the actual propagation. The multiburst servo reference corresponds to the location of the read element in units of track number. At the time of writing the last track in the startup pattern, the readback amplitudes are measured and the location of the read element is computed using the same formula as the multiburst servo uses for interpolating positions. Adding 1.0 to this gives the correct value of the servo reference to write the next track and begin the propagation itself.

While the invention has been particularly shown and described with reference to preferred embodiment(s) thereof, it will be understood by those skilled in the art that various changes in form and details may be made therein without departing from the spirit and scope of the invention.

What is claimed is:

1. In a data storage system, a method for positioning an actuator over a storage medium in motion relative thereto, comprising:
    using a compliant structure to position the actuator over the medium, including:
        forcing the actuator against the compliant structure with a first force to reach a first position over the medium; and
        forcing the actuator against the compliant structure with a second force to at least partially compress the compliant structure and thereby reach a second position over the medium.

2. The method of claim 1, further comprising:
    writing a first track of bursts on the medium at the first position; and
    writing a second track of bursts on the medium at the second position.

3. The method of claim 2, further comprising:
    measuring the distance between the first and second tracks of bursts.

4. The method of claim 3, further comprising: comparing the measured distance to a desired distance.

5. The method of claim 4, further comprising:
    erasing the first and second tracks of bursts; and
    re-writing the first and second tracks of bursts by repeating said forcing steps and changing at least one of the first and second forces.

6. The method of claim 4, wherein the measuring comprises:
    obtaining from the first track of bursts a first peak readback signal with a read element on the actuator approximately centered over the first track;
    moving the read element away from the center of the first track using a parameter based on the desired distance;
    sensing a second readback signal from the second track of bursts with the read element; and
    obtaining the measured distance from the first and second readback signals.

7. The method of claim 6, wherein the measuring further comprises:
forcing the actuator against the structure to place the read element approximately over the first track of bursts; and
stepping the read element about the first track of bursts to locate the center thereof and therefore the first peak readback signal.

8. The method of claim 1, wherein the actuator is forced against the compliant structure using a positioning signal applied to a motor used to move the access element.

9. The method of claim 1 in combination with a method for self-servowriting a servopattern on the storage medium, wherein the actuator comprises a read element separated from a write element generally along a direction in which the self-servowriting steps across the medium.

10. The method of claim 1 wherein the compliant structure comprises a crashstop of the data storage system.

11. In a data storage system having an actuator and a medium in motion relative thereto, the medium requiring a servopattern thereon to be used by the system to guide the actuator, a method for self-servowriting an initial set of tracks on the medium, comprising:
using a compliant structure in the system to position the actuator for writing the initial set of tracks, including forcing the actuator against the compliant structure with at least two different forces to thereby reach at least two different positions over the medium, wherein at least one of the forces at least partially compresses the compliant structure; and
writing respective tracks of bursts on the medium at the at least two different positions.

12. The method of claim 11, wherein the actuator comprises a read element separated from a write element generally along a direction in which the self-servowriting steps across the medium.

13. The method of claim 11 wherein the compliant structure comprises a crashstop of the data storage system.

14. In a data storage system, a system for positioning an actuator over a storage medium in motion relative thereto, comprising:
means for using a compliant structure to position the actuator over the medium, including:
means for forcing the actuator against the compliant structure with a first force to reach a first position over the medium; and
means for forcing the actuator against the compliant structure with a second force to at least partially compress the compliant structure and thereby reach a second position over the medium.

15. The system of claim 14, further comprising:
means for writing a first track of bursts on the medium at the first position; and
means for writing a second track of bursts on the medium at the second position.

16. The system of claim 15, further comprising:
means for measuring the distance between the first and second tracks of bursts.

17. The system of claim 16, further comprising:
means for comparing the measured distance to a desired distance.

18. The system of claim 17, further comprising:
means for erasing the first and second tracks of bursts; and
means for re-writing the first and second tracks of bursts by repeating said forcing steps and changing at least one of the first and second forces.

19. The system of claim 17, wherein the measuring comprises:
means for obtaining from the first track of bursts a first peak readback signal with a read element on the actuator approximately centered over the first track;
means for moving the read element away from the center of the first track using a parameter based on the desired distance;
means for sensing a second readback signal from the second track of bursts with the read element; and
means for obtaining the measured distance from the first and second readback signals.

20. The system of claim 19, wherein the means for measuring further comprises:
means for forcing the actuator against the structure to place the read element approximately over the first track of bursts; and
means for stepping the read element about the first track of bursts to locate the center thereof and therefore the first peak readback signal.

21. The system of claim 14, wherein the actuator is forced against the compliant structure using a positioning signal applied to a motor used to move the access element.

22. The system of claim 14 in combination with a system for self-servowriting a servopattern on the storage medium, wherein the actuator comprises a read element separated from a write element generally along a direction in which the self-servowriting steps across the medium.

23. The system of claim 14 wherein the compliant structure comprises a crashstop of the data storage system.

24. In a data storage system having an actuator and a medium in motion relative thereto, the medium requiring a servopattern thereon to be used by the system to guide the actuator, a system for self-servowriting an initial set of tracks on the medium, comprising:
means for using a compliant structure in the system to position the actuator for writing the initial set of tracks, including forcing the actuator against the compliant structure with at least two different forces to thereby reach at least two different positions over the medium, wherein at least one of the forces at least partially compresses the compliant structure; and
means for writing respective tracks of bursts on the medium at the at least two different positions.

25. The system of claim 24, wherein the actuator comprises a read element separated from a write element generally along a direction in which the self-servowriting steps across the medium.

26. The system of claim 24 wherein the compliant structure comprises a crashstop of the data storage system.

* * * * *